Jan. 12, 1926.

C. H. PALMER

SPRING SUSPENSION

Filed Feb. 29, 1924

1,569,670

WITNESSES
M. E. Downey
C. L. Nash

INVENTOR
Charles H. Palmer
By R. S. Caldwell
ATTORNEY

Patented Jan. 12, 1926.

1,569,670

UNITED STATES PATENT OFFICE.

CHARLES H. PALMER, OF MILWAUKEE, WISCONSIN.

SPRING SUSPENSION.

Application filed February 29, 1924. Serial No. 695,946.

*To all whom it may concern:*

Be it known that I, CHARLES H. PALMER, a citizen of the United States, and resident of Milwaukee, in the county of Milwaukee and State of Wisconsin, have invented new and useful Improvements in Spring Suspensions, of which the following is a description, reference being had to the accompanying drawings, which are a part of this specification.

The invention relates to spring suspensions suitable for use in vehicles.

An object of the invention is to provide a spring suspension of the spring and lever type which will afford the proper cushioning under both light and heavy loads.

Another object of the invention is to provide a spring suspension of this type in which the recoil is controlled.

The invention further consists in the several features hereinafter set forth and more particularly defined by claims at the conclusion hereof.

In the drawings, Fig. 1 is a plan view of a spring suspension constructed in accordance with this invention, parts being broken away and parts being shown in section.

Figure 1:
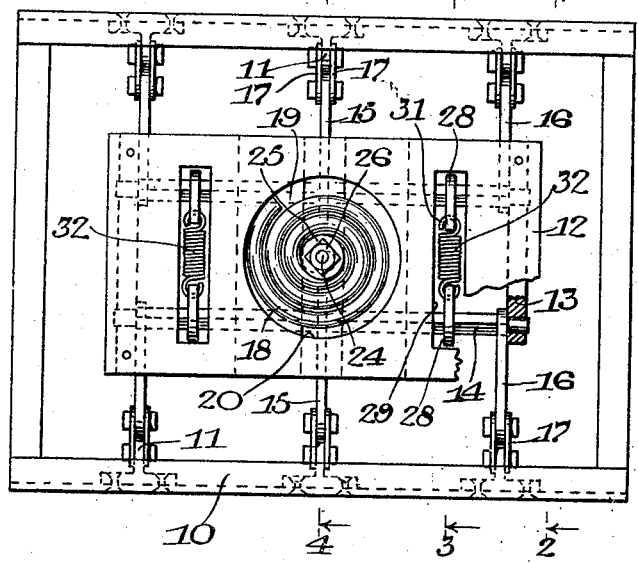
Figure 2:
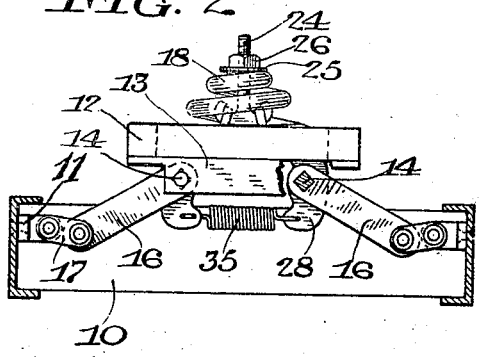
Fig. 2 is a vertical sectional view taken on the line 2—2 of Fig. 1, parts being broken away.

In the drawings, 10 indicates a supporting frame on which sets of alined brackets 11 are secured at opposite sides. A load-receiving frame or platform 12 is provided with bearing brackets 13 secured transversely below the platform at its ends, and a pair of spaced parallel polygonal shafts 14 extend between the bearing brackets and are journalled therein. Arms or levers 15 and 16 are keyed on said shafts at their central and terminal portions respectively and extend outwardly from each shaft adjacent the brackets 11 to which they are connected by shackles 17. A conically coiled compression spring 18 is mounted on ledges 19 within a centrally disposed opening 20 in the platform. The inner ends 21 of the levers 15 extend into the opening 20 and are slotted at their underside to form hooked projections 22. A T-shaped hook bolt 23 has its threaded end 24 extending through the upper opening of the spring and is provided with a thrust washer 25 held in engagement at the upper end of the spring by an adjustable nut 26. A pair of shackles 27 connects the hook bolt with the hooked projections 22 on the inner ends of the levers 15.

Levers 28 are keyed to the shafts 14 intermediate the levers 15 and 16, and are disposed in substantially vertical position. The upper ends of the levers 28 extend into transverse openings 29 in the platform and are provided with slots 30 to take the hooked ends 31 of a snubbing spring 32. The lower ends of the levers 28 are provided with similar slots 33 to take the hooked ends 34 of a supplementary spring 35. The hooked ends of the springs 32 and 35 are permitted a limited play in the slots 30 and 33, which extend in a longitudinal direction with respect to the springs and thus afford lost motion connections which allow some outward movement of corresponding ends of the levers 28 before the springs are placed under tension by the further movement of the levers.

Thus it will be seen that the platform 12 is resiliently mounted on the frame 10 by the shackled arms 15 and 16 keyed on the shafts 14 which are under the influence of the conical spring 18, the supplementary springs 35 and the snubbing springs 32. The presence of a light load on the platform will deflect the central spring alone, the supplementary springs 35 being inactive by reason of their lost motion connections with the levers 28.

Figure 3:
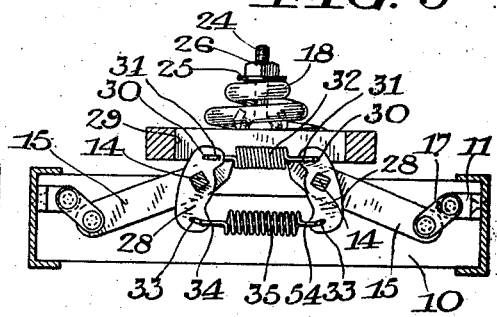
Fig. 3 is a similar view taken on the line 3—3 of Fig. 1 but showing the deflection under load.
Figure 4:
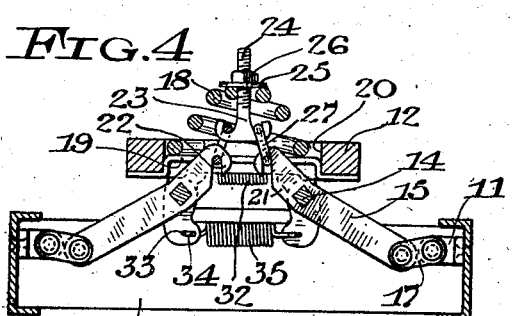
Fig. 4 is a similar view taken on the line 4—4 of Fig. 1.

When a heavier load is imposed, producing the deflection seen in Fig. 3, the spring 35 will come into action to produce the added stiffness desirable for carrying such load, whereas under a light load it is desirable to have the more sensitive spring action afforded by the central spring 18 acting alone. The nut 26 on the hook bolt 23 may be adjusted to produce any desired initial deflection of the spring 18.

The snubbing springs 32 remain normally inactive by reason of their lost motion connections with the upper ends of the levers 28 but come into action on the recoil before the central spring has exhausted itself to gradually decelerate the upward movement of the load-receiving frame with respect to the supporting frame.

I desire it to be understood that this invention is not limited to any specific form or arrangement of parts except in so far as such limitations are specified in the claims.

What I claim as new and desire to secure by Letters Patent is:

1. In a spring suspension, the combination with a supporting frame, of a load-receiving frame having a pair of spaced parallel shafts rotatably mounted thereon, arms fixed to said shafts and having their outer ends pivotally connected to said supporting frame at opposite sides, a spring mounted on said load-receiving frame and operatively connected to said shafts to yieldingly restrain their rotation under load, and a second spring supported from said shafts and operatively connected thereto to yieldingly restrain the rotation of said shafts in a direction opposite to that produced by an impressed load, whereby said last-named spring becomes effective on the recoil of the first-named spring to decelerate the upward movement of said load-receiving frame.

2. In a spring suspension, the combination with a supporting frame, of a load-receiving frame having a pair of spaced parallel shafts rotatably mounted thereon, arms fixed to said shafts and having their outer ends pivotally connected to said supporting frame at opposite sides, a spring mounted on said load-receiving frame and operatively connected to said shafts to yieldingly restrain their rotation under load, a pair of arms fixed to said shafts and extending therefrom at an angle to a common axial plane through said shafts to have their free ends move apart on the upward movement of said load-receiving frame, and a tension spring connecting the free ends of the last-named arms, whereby said spring becomes effective on the recoil of the first-named spring to decelerate the upward movement of said load-receiving frame.

3. In a spring suspension, the combination with a supporting frame, of a load-receiving frame having a pair of spaced parallel shafts rotatably mounted thereon, arms fixed to said shafts and having their outer ends pivotally connected to opposite sides of said supporting frame, a spring mounted on said load-receiving frame and operatively connected to said shafts to yieldingly restrain their rotation under load, a pair of springs operatively connected to said shafts to yieldingly restrain their rotation in opposite directions, means whereby one of said springs becomes effective after a predetermined deflection of said first-named spring, and means whereby the other of said springs becomes effective on the recoil of said first-named spring.

4. In a spring suspension, the combination with a supporting frame, of a load-receiving frame having a pair of spaced parallel shafts rotatably mounted thereon, arms fixed to said shafts and having their outer ends pivotally connected to opposite sides of said supporting frame, a compression spring mounted on said load-receiving frame and operatively connected to said shafts to yieldingly restrain the downward movement of said load-receiving frame, a pair of tension springs operatively connected to said shafts to yieldingly restrain their rotation in opposite directions, and lost motion connections whereby one of said springs becomes effective after a predetermined deflection of said first-named spring and the other of said springs becomes effective on the recoil of said first-named spring.

5. In a spring suspension, the combination with a supporting frame, of a load-receiving frame having a pair of spaced parallel shafts rotatably mounted thereon, arms fixed to said shafts and having their outer ends pivotally connected to opposite sides of said supporting frame, a compression spring mounted on said load-receiving frame and operatively connected to said shafts to yieldingly restrain the downward movement of said load-receiving frame, a pair of levers fixed to said shafts and extending transversely of a common axial plane therethrough, a spring connecting the lower ends of said levers and effective to yieldingly restrain rotation of said shafts after a predetermined deflection of said first-named spring, and a second spring connecting to the upper ends of said levers and effective to control the recoil of said first-named spring.

In testimony whereof I affix my signature.

CHARLES H. PALMER.